United States Patent
Giardini et al.

(10) Patent No.: US 10,773,296 B2
(45) Date of Patent: Sep. 15, 2020

(54) METHOD FOR MANUFACTURING TURBOMACHINE MEMBER RING SUPPORTS

(71) Applicant: SAFRAN AIRCRAFT ENGINES, Paris (FR)

(72) Inventors: Bruno Giardini, Morsang sur Orge (FR); Emmanuel Bernard Marie Charrier, Frossay (FR); Frederic Hascoet, Saint Germain les Corbeil (FR); Didier Spire, Soisy sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 288 days.

(21) Appl. No.: 15/505,967

(22) PCT Filed: Aug. 26, 2015

(86) PCT No.: PCT/FR2015/052275
§ 371 (c)(1),
(2) Date: Feb. 23, 2017

(87) PCT Pub. No.: WO2016/030632
PCT Pub. Date: Mar. 3, 2016

(65) Prior Publication Data
US 2017/0274441 A1   Sep. 28, 2017

(30) Foreign Application Priority Data

Aug. 28, 2014 (FR) ...................... 14 58079

(51) Int. Cl.
*B21D 53/16* (2006.01)
*B21D 22/06* (2006.01)
(Continued)

(52) U.S. Cl.
CPC ............. *B21D 53/16* (2013.01); *B21D 22/06* (2013.01); *B21D 53/92* (2013.01); *B23P 15/00* (2013.01);
(Continued)

(58) Field of Classification Search
CPC ........... F01D 9/02; B23P 13/02; B21J 13/025; B21D 22/06
(Continued)

(56) References Cited

U.S. PATENT DOCUMENTS 1,625,131 A * 4/1927 Miller .................. B21D 19/005
425/DIG. 5
1,999,482 A * 4/1935 Riemenschneider .. B21D 53/16
16/108
(Continued)

FOREIGN PATENT DOCUMENTS

DE   WO1997013612 A1 * 4/1992 ............. B23P 15/00
DE   10 2011 102 598 A1   11/2012
(Continued)

OTHER PUBLICATIONS

Machine Translation of WO1997013612A1 (Year: 1997).*
(Continued)

*Primary Examiner* — Jacob J Cigna
*Assistant Examiner* — Michael W Hotchkiss
(74) *Attorney, Agent, or Firm* — Oblon, McClelland, Maier & Neustadt, L.L.P.

(57) ABSTRACT

Turbomachine member ring supports extending over sectors of a circle can be constructed from at least one thick flat metal sheet that is curved and welded to form a cylindrical shroud and then formed by pressing into a conical shroud, the outer face of which is machined in order to shape the profile of a mounting rail therein, and the shroud is sectioned in order to divide it into the sectors. The supports have better (Continued)

cohesion and the manufacture thereof is simple and reliable compared with traditional manufacture using bossing of thin metal sheets for joining together the main portions of the supports. The application also relates to a use with stator rings of a turbomachine member that are provided with an abradable lining.

19 Claims, 4 Drawing Sheets

(51) Int. Cl.
  *B21D 53/92* (2006.01)
  *F01D 9/04* (2006.01)
  *F01D 25/24* (2006.01)
  *F01D 11/12* (2006.01)
  *B23P 15/00* (2006.01)

(52) U.S. Cl.
  CPC .............. *F01D 9/04* (2013.01); *F01D 11/127* (2013.01); *F01D 25/246* (2013.01); *F05D 2230/25* (2013.01); *F05D 2240/11* (2013.01)

(58) Field of Classification Search
  USPC ..................................................... 72/105, 69
  See application file for complete search history.

(56) References Cited

U.S. PATENT DOCUMENTS

| | | | | |
|---|---|---|---|---|
| 2,711,659 A * | 6/1955 | Foster | ................... | B21D 53/34 72/399 |
| 3,999,416 A * | 12/1976 | Brooks | ................... | B21H 1/06 72/69 |
| 4,068,362 A * | 1/1978 | Spisak | ................... | B21D 53/16 29/415 |
| 4,138,776 A * | 2/1979 | Oldford | ............... | B21D 53/261 29/892.11 |
| 4,150,557 A | 4/1979 | Walker et al. | | |
| 4,361,021 A * | 11/1982 | McVay | ................... | B21D 53/18 29/412 |
| 4,476,194 A * | 10/1984 | Sanborn | .................... | B21B 1/16 228/158 |
| 4,770,283 A * | 9/1988 | Putz | ....................... | B21D 53/16 192/107 M |
| 4,925,365 A | 5/1990 | Crozet et al. | | |
| 5,031,433 A * | 7/1991 | Nishimura | ........... | B21D 53/261 29/892.11 |
| 5,125,256 A * | 6/1992 | Ohkubo | ................. | B21D 53/16 29/893.34 |
| 5,228,195 A * | 7/1993 | Brown | .................... | F01D 11/12 219/107 |
| 6,341,938 B1 * | 1/2002 | Zegarski | ............... | F01D 11/127 415/173.4 |
| 8,177,493 B2 * | 5/2012 | Castel | ....................... | F01D 9/04 415/173.4 |
| 8,240,043 B2 * | 8/2012 | Duesler | ................. | F01D 11/001 29/889.2 |
| 9,587,499 B2 * | 3/2017 | Albers | ..................... | F01D 9/042 |
| 9,816,615 B2 * | 11/2017 | Stahl | ...................... | B23K 26/38 |
| 2009/0212031 A1 * | 8/2009 | Stahl | ...................... | B21D 53/16 219/121.72 |
| 2014/0099194 A1 | 4/2014 | Johnston et al. | | |
| 2015/0050135 A1 * | 2/2015 | Grilli | ...................... | B23P 15/00 415/193 |

FOREIGN PATENT DOCUMENTS

| | | |
|---|---|---|
| EP | 0 356 305 A1 | 2/1990 |
| EP | 2 716 873 A2 | 4/2014 |
| JP | 2001-221007 A | 8/2001 |

OTHER PUBLICATIONS

International Search Report dated Dec. 9, 2015 in PCT/FR2015/052275 filed Aug. 26, 2015.

French Search Report dated May 26, 2015 in FR1458079 filed Aug. 28, 2014.

* cited by examiner

METHOD FOR MANUFACTURING TURBOMACHINE MEMBER RING SUPPORTS

The subject of the disclosed invention is a method for manufacturing turbomachine member ring supports.

The turbomachine member ring supports considered herein extend on truncated conical sectors along a longitudinal axis in a stator and are fitted with a sealing lining on their inner face relative to the longitudinal axis that can be made of an abradable honeycomb material surrounding a circular mobile wheels stage of the machine rotor in order to reduce clearances. The supports have parts for assembly to adjacent stator structures, and particularly a "rail" projecting from their outer face relative to the longitudinal axis.

There are several known methods of manufacturing them. The first is based on forging, but this requires a powerful machine, complex shaped forging dies and hot working that requires precautions to protect the alloy quality, for example preventing the occurrence of mill scale.

Another method uses a welded or brazed assembly of thin plates to form the support. However, the strength of the assembly may be problematic due to large thermal expansions that occur on these parts in service, and manufacturing can be complicated.

A new method is disclosed herein to manufacture such turbine ring supports in which all operations are simple.

In its general form, the invention relates to a method of manufacturing ring supports for a turbomachine member, said supports extending around conical sectors on which a sealing lining is fitted on an inner face and a mounting rail is fitted on an outer face opposite the inner face, the mounting rail including a depression limited by a collar rising along a radially outwards direction from the support, characterised in that it consists of starting from at least one plane metal sheet with a thickness equal to a distance between the inner face and the outer face plus a height of the collar, bending and welding the plate or plates together to form a closed circular cylindrical shroud, bending the cylindrical shroud in tooling to form a conical shroud, machining the outer face of the conical shroud to form the rail on it, and cutting the conical shroud shell to divide it into sectors corresponding to the supports.

In other words, the essential characteristics of the invention are that it starts from thick plates in which the relief of rails is cut, avoiding any assembly of thin plates while minimising corrective machining, and that a support circle is manufactured simultaneously, instead of making these elements separately. This results in several advantages, as will be described later.

The preliminary bending of the plate or plates into a cylindrical shape can be done using a simple deformation tool, as can the next step for pressing and shaping into a conical shape making use of a machine with several concentric jaws. The closed and regular circular shape of the blank thus enables simple machining operations to shape the rail by pressing and then by machining, that can consist of turning.

Note that the bending and shaping operations that do not involve large deformations can be done cold, which simplifies the method and avoids the need to consider the consequences of heating on the final properties of the part.

The different manufacturing methods must respect the dimensions of the requested product. But since the last important operation in this case is machining, it is easy to respect this condition; however, some portions, such as the inner face that is not visible but that is fitted with a sealing lining, can remain unmachined.

It is also easier to manufacture to correct dimensions making use of one important embodiment of the invention in which the jaws and the static ring have biconical profiles symmetric about a median plane, so as to shape a double conical or biconical shroud symmetric on each side of a median plane, which tends to balance applied axial forces and deformations of the tool.

The different aspects of one purely illustrative embodiment of the invention will now be described in more detail with reference to the following figures.

Figure 10:
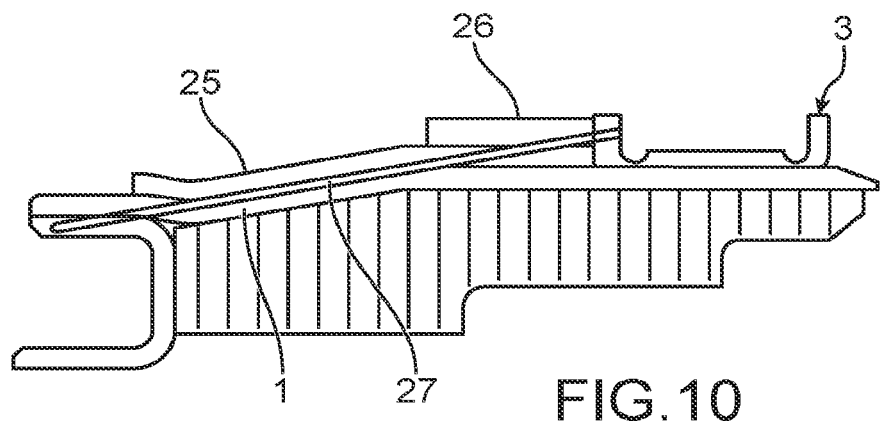
Figure 11:
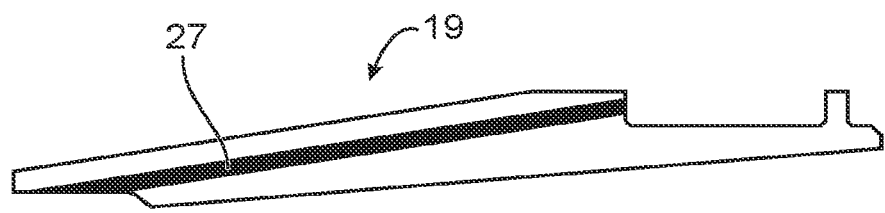

and FIGS. 10 and 11 illustrate the lateral ends of the known support and a product support according to the invention, respectively.

Figure 1:
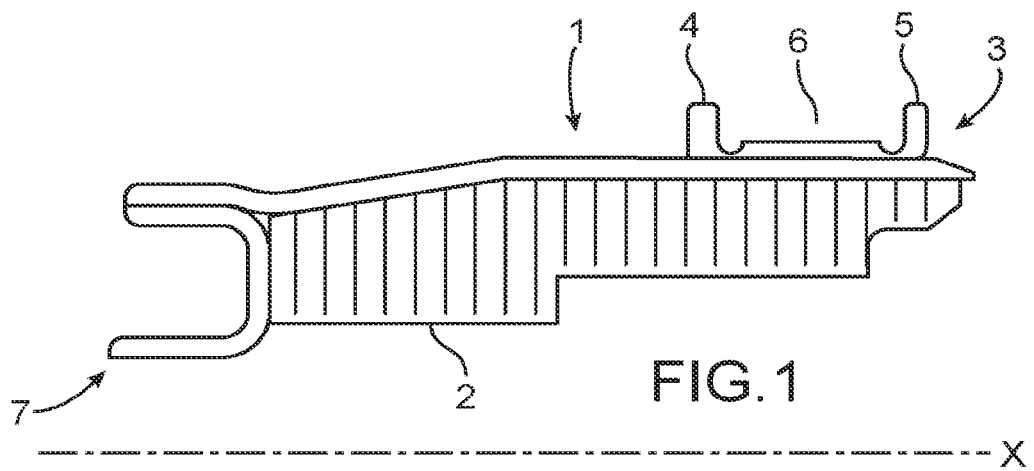
FIG. 1 is a representation of a known support.

FIG. 1 represents a ring support for a member of a turbomachine such as a turbine made by welding and brazing of thin plates making use of a known technique. A main plate 1 has a more or less regular conical shape around an angular sector and comprises an inner face onto which an abradable honeycomb sealing lining 2 is fixed; there is an outer mounting rail 3 composed of a second thin plate on its outer face, curved so as to have two projecting collars 4 and 5, rising radially outwards, with an intermediate depression 6. There is another mounting rail 7, also with a U-section but for which the central concave part is facing along the axial direction of the machine, at an axial end. The rails 3 and 7 are both brazed to the main plate 1. As seen above, it may be complicated to manufacture the support and its strength may be unpredictable in the long term under the many thermal cycles applied to it. FIG. 10 illustrates the particular form of the support at each of its angular ends: two other plates 25 and 26 are welded to it on the outer face of the main plate 1, so as to thicken the section of the support so that a slit 27 can be formed on its side face, a portion of the sealing plate fitting into the slit 27 and covering the gap between the two supports when the support is mounted and adjacent to a similar support. These plates 25 and 26 make manufacturing of the support more complicated. FIG. 1 and the other figures show the longitudinal X axis of the machine on which the supports will be mounted, in circles around this X axis.

Figure 2:
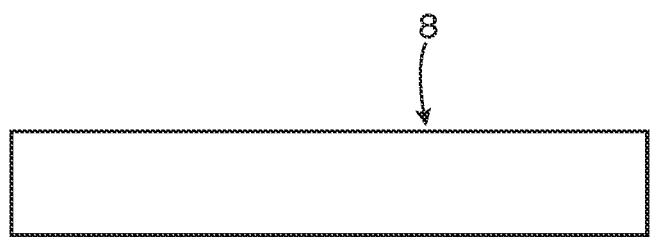
FIG. 2 illustrates the flat plate used at the beginning of the invention.
Figure 3:
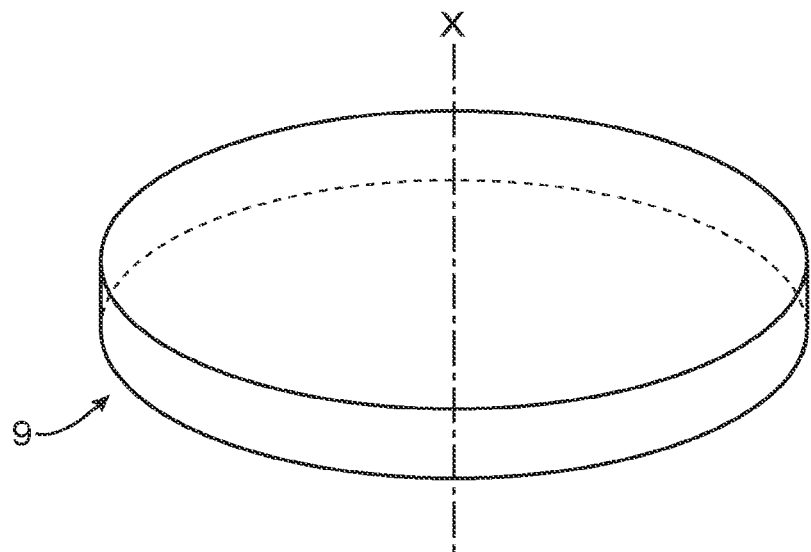
FIG. 3 illustrates bending this plate into a cylindrical shroud.

We will now give a description of the invention starting with FIG. 2. The raw material consists of a flat plate 8, or a small number of such plates 8. The plate 8 or plates 8 pass through a bending installation in which they are bent so as to obtain a cylindrical shroud 9 (FIG. 3), that is made continuous by closing the circle by welding, after trimming the end edges. It is preferable to use the smallest possible number of plates 8 and this is why a good compromise may be to use three plates 8, each of which is curved in a half of a circle or a third of a circle; however, a single plate can be curved into an entire circle despite its thickness.

Figure 4:
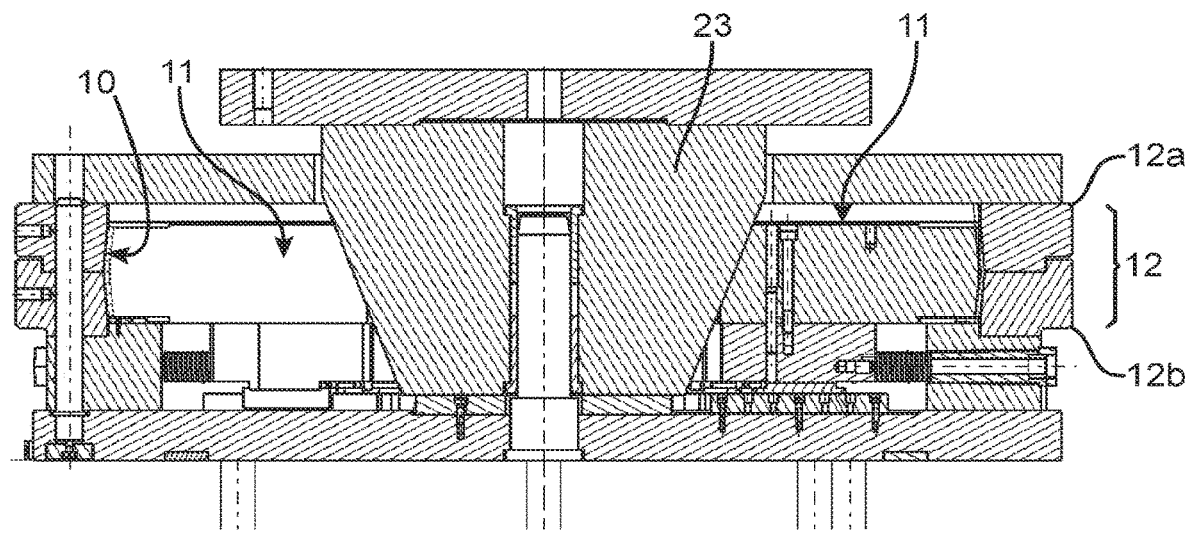
FIGS. 4 and 5 illustrate two views of the stamping press that creates a biconical shroud.
Figure 5:
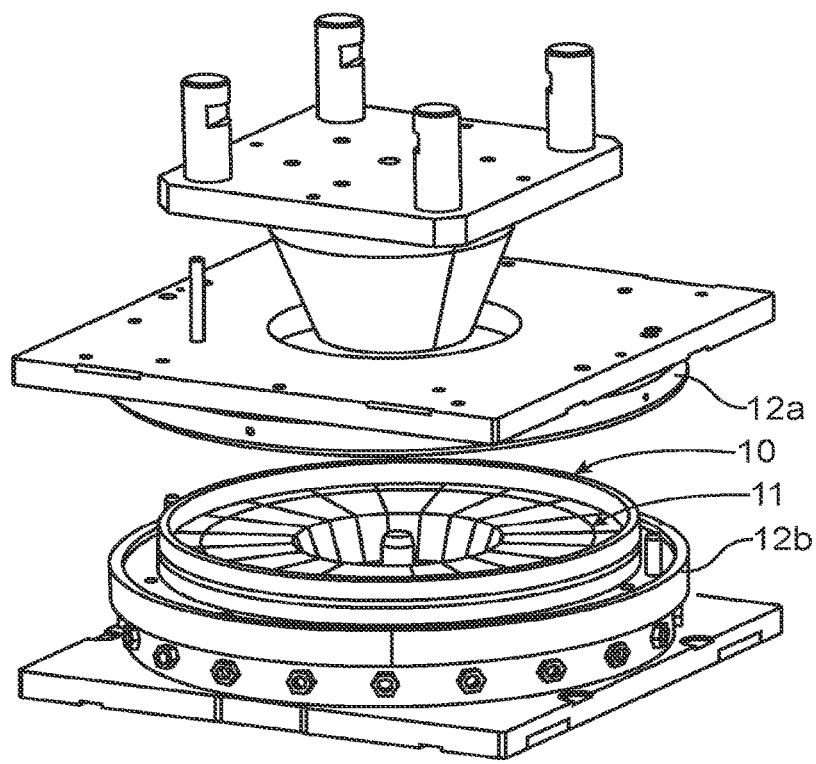

The next step represented in FIGS. 4 and 5, consists of shaping the cylindrical shell 9 into a conical shroud, and more advantageously a biconical shroud 10, so as to follow the change of radius in the turbine. The cylindrical shroud 9 is put into equipment including a stamping tool such as a press including a circular row of jaws 11, with concomitant radial displacement that are pushed together by a central conical broach 23, and a static ring 12 that faces them and is concentric with them. The biconical shape is obtained by the static ring being concave and the jaws 11 projecting at the centre. In moving the jaws 11 towards the ring 12, the cylindrical shroud is deformed into the required biconical shape. Stamping may comprise an expansion part that increases the radius of the biconical shroud 10. It will be observed that the ring 12 is formed from two superposed stages 12a and 12b, that can be separated by lifting the upper stage 12a to insert and then remove the shrouds 9 or 10.

It is useful to avoid excessive force unbalances that can occur during this operation, that can be cause of manufacturing dimensions not being respected. The circular shape of the press makes it possible to equalise forces in the angular direction; and unbalanced forces in the axial direction of the shroud 9 or 10 can be cancelled out if the tool is symmetrical on opposite sides of a median plane, as it is in this case, due to the biconical profile of the jaws 11 and the ring 12.

However, it should be noted that all steps of the method can be done cold due to the small deformation applied to the material, both in the bending step (the deformation being distributed over a long length) and the shaping step into a biconical shape.

Figure 6:
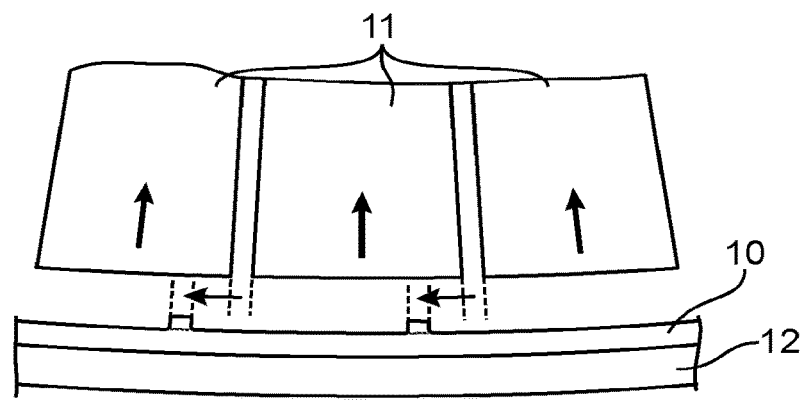
FIG. 6 illustrates the choice of stamping in two passes.

This shaping by stamping step will usually be made in two passes due to discontinuities between the jaws 11 along the circular row; after a first pass, the biconical shell 10 will be moved by one angular step between jaws 11 corresponding to a few degrees, so as to move each portion of the periphery in front of one of the jaws 11 after each pass (FIG. 6) and thus to make the biconical shroud uniformly circular, eliminating any flat portions remaining between the jaws 11 after the first pass.

Figure 7:
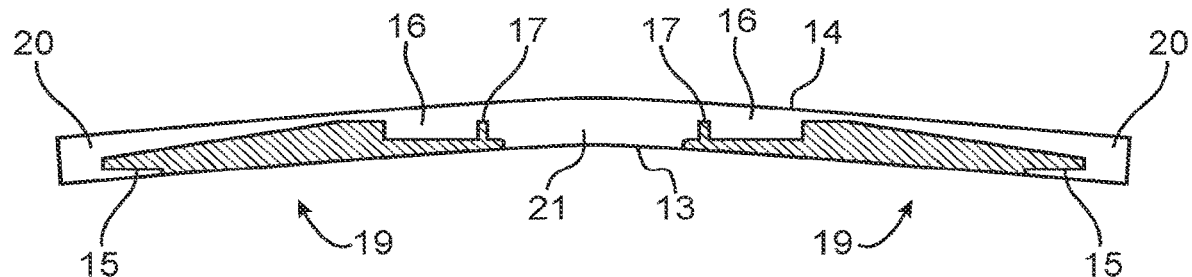
FIG. 7 illustrates how machining is done.

FIG. 7 illustrates the shape of the biconical shroud 10 superposed on a pair of supports 19 to be obtained. Manufacturing operations will now consist of machining and particularly turning in a conventional numerically controlled machine like a lathe. As mentioned above, the symmetric biconical shape of the shroud 10, designed to equalise forces in the axial direction of the stamping press, is designed to form a circle of supports 19 in each of its halves. The biconical shell 10 comprises an inner surface 13 and an outer face 14. The inner face 13 remains essentially unmachined over at least most of its surface, except for the excavation of a recess 15 at one end of each support 19 in which the rail 7 will fit, that is unchanged from the previous design. On the other hand, the outer face 14 will be completely machined since the support dimensions 19 must be precise and the surface condition must be good at this location, which is not the case for most of the inner face 13 on the sealing lining 2 is fitted and is therefore not visible; in particular, a groove 16 will be excavated corresponding to the concave shape of the rail 3 in the previous design, and a collar 17 similar to the collar 5 will be formed at the end of each of the supports 19. The last operations will consist of chopping off the ends 20 of the biconical shroud 10, in a first step to divide it so as to separate the two circles of supports 19, by completely removing the centre 21, and cutting the two circles of supports 19 into angular sectors so as to separate the supports 19 from each other. Slits 27 are made at the lateral ends in a final step, directly at the mid-thickness of the plate (FIG. 11).

Figure 8:
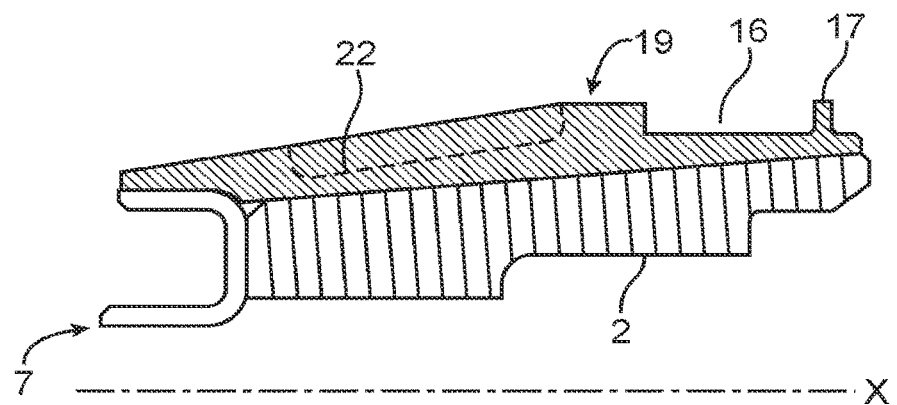
FIGS. 8 and 9 represent two views of a support according to the invention.
Figure 9:
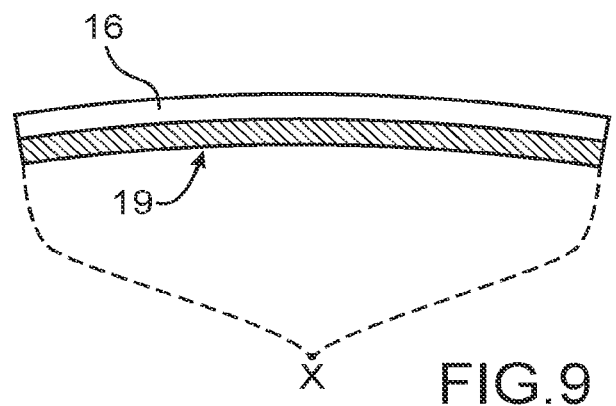

FIGS. 8 and 9 illustrate one of the supports 19 finally obtained after having installed the rail 7 and the sealing lining 2. The portion including the groove 16 and the collar 17 carved in the mass of the biconical shroud 10, has the same dimensions as the concave part 6 and the collar 5 according to the prior design, such that the support 19 can perfectly replace the support 1. Note that the support 19 will be heavier because it is formed from a plate 8 thicker than the plate of the support 1. However, this disadvantage can be attenuated by excavating its outer face by milling at the centre, without reaching the groove 16. Milling operations 22 are discontinuous and are not applied at the edges of the supports 19.

Replacing the add-on rail 3 by a single-piece portion of the support 19 contributes to improving its cohesion, and it reliably produces correct dimensions. Thus, remachining work is minimised.

The invention claimed is:

1. A method of manufacturing ring supports for a member of a turbomachine, said supports extending around angular sectors of a cone, comprising a sealing lining on an inner face of the cone and a mounting rail on an outer face of the cone opposite the inner face, the mounting rail comprising a groove limited by at least one collar protruding in an outer radial direction of the cone, the method comprising:
   a) starting from at least one plane metal sheet,
   b) bending and welding the at least one metal sheet to form a closed cylindrical shroud,
   c) bending the cylindrical shroud in a tooling to form a conical shroud,
   d) cutting the conical shroud to divide the conical shroud into said angular sectors,
   e) wherein the mounting rail is formed, after said bending of the cylindrical shroud and before the cutting of the conical shroud, by machining the outer face of the support to excavate the groove and carve the at least one collar out of a material of the conical shroud, and
   wherein the tooling in which the cylindrical shroud is shaped comprises a circular row of jaws with radial expansion and an outer static ring surrounding the circular row.

2. The manufacturing method according to claim 1, wherein the bending and shaping are done cold.

3. The manufacturing method according to claim 1, wherein the cylindrical shroud is shaped in the tooling in two jaw expansion passes, and is turned by an angular step between the jaws between the two expansion passes.

4. The manufacturing method according to claim 1, wherein said at least one plane metal sheet comprises at least two plates.

5. The method of claim 1, wherein the conical shroud is a biconical shroud, and the biconical shroud is cut to divide it into two circles of the supports, by removing a center of the biconical shroud, before cutting the two circles of the supports into said angular sectors.

6. The method of claim 1, wherein the outer face is excavated at the center with discontinuous milling operations.

7. The method of claim 1, wherein a recess is machined at an end of the inner face, in which a second mounting rail, comprising a central concave part facing an axial direction of the turbomachine, is to be inserted by brazing.

8. The method of claim 1, wherein the cutting includes cutting in a radial direction to form the angular sectors.

9. The method of claim 1, wherein the cutting includes separating the angular sectors from each other.

10. A method of manufacturing ring supports for a member of a turbomachine, said supports extending around angular sectors of a cone, said supports comprising a sealing lining on an inner face of the cone and a mounting rail on an outer face of the cone opposite the inner face, the mourning rail comprising a groove extending between two collars protruding in an outer radial direction of the cone, the method comprising:

a) starting from at least one plane metal sheet,
b) bending and welding the at least one metal sheet to form a closed cylindrical shroud,
c) bending the cylindrical shroud in a tooling to form a conical shroud,
d) cutting the conical shroud to divide the conical shroud into said angular sectors,
e) wherein the mounting rail is formed, after said bending of the cylindrical shroud and before said cutting of the conical shroud, by machining the outer face of the support by turning the conical shroud in a lathe to excavate the groove and excavate the outer face at a center, so as to carve the two collars out of a material of the conical shroud.

11. The method of claim 10, wherein the conical shroud is a biconical shroud, and the biconical shroud is cut to divide the biconical shroud into two circles of the supports, by removing a center of the biconical shroud, before cutting the two circles of the supports into said angular sectors.

12. The method of claim 10, wherein the outer face is excavated at the center with discontinuous milling operations.

13. The method of claim 10, wherein a recess is machined at an end of the inner face, in which a second mounting rail, comprising a central concave part facing an axial direction of the turbomachine, is to be inserted by brazing.

14. The method of claim 10, wherein the bending and shaping are done cold.

15. The method according to claim 10, wherein said at least one plane metal sheet comprises at least two plates.

16. The method according to claim 10, wherein the cutting includes cutting in a radial direction to form the angular sectors.

17. The method according to claim 10, wherein the cutting includes separating the angular sectors from each other.

18. The method of claim 10, wherein the tooling in which the cylindrical shroud is shaped comprises a circular row of jaws with radial expansion and an outer static ring surrounding the circular row.

19. The method of claim 18, wherein the cylindrical shroud is shaped in the tooling in two jaw expansion passes, and is turned by an angular step between the jaws between the two expansion passes.

* * * * *

UNITED STATES PATENT AND TRADEMARK OFFICE
CERTIFICATE OF CORRECTION

PATENT NO. : 10,773,296 B2  
APPLICATION NO. : 15/505967  
DATED : September 15, 2020  
INVENTOR(S) : Bruno Giardini et al.

Page 1 of 1

It is certified that error appears in the above-identified patent and that said Letters Patent is hereby corrected as shown below:

In the Claims

In Column 5, Line 2, in Claim 11, delete "mourning" and insert --mounting--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*